(12) United States Patent
Olinger et al.

(10) Patent No.: US 11,319,010 B2
(45) Date of Patent: *May 3, 2022

(54) HIGH-DENSITY BIKE RACK SYSTEM

(71) Applicant: Flycycle, Inc., Cambridge, MA (US)

(72) Inventors: Jeffrey R. Olinger, Cambridge, MA (US); Julia C. Hansen, Cambridge, MA (US)

(73) Assignee: FLYCYCLE, INC., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/788,100

(22) Filed: Oct. 19, 2017

(65) Prior Publication Data

US 2018/0105220 A1 Apr. 19, 2018

Related U.S. Application Data

(60) Provisional application No. 62/511,519, filed on May 26, 2017, provisional application No. 62/410,242, filed on Oct. 19, 2016.

(51) Int. Cl.
*B62H 3/12* (2006.01)
*B62H 3/04* (2006.01)
*B62H 3/08* (2006.01)

(52) U.S. Cl.
CPC ............. *B62H 3/12* (2013.01); *B62H 3/04* (2013.01); *B62H 3/08* (2013.01)

(58) Field of Classification Search
CPC .............. B62H 3/12; B62H 3/04; B62H 3/08
See application file for complete search history.

(56) References Cited

U.S. PATENT DOCUMENTS

| 2,380,344 | A |   | 7/1945 | Sutton |
|-----------|---|---|--------|--------|
| 2,806,605 | A | * | 9/1957 | Loveland ................. B62H 3/04 211/22 |
| D201,143 | S | * | 5/1965 | Vigilante ........................ 211/22 |
| 3,529,729 | A | * | 9/1970 | Gappa ..................... B63H 3/04 211/20 |
| 3,785,500 | A | * | 1/1974 | Kennelly ................. B62H 3/04 211/21 |
| D234,587 | S | * | 3/1975 | Harris et al. ................. D12/115 |

(Continued)

FOREIGN PATENT DOCUMENTS

| DE | 102008013535 A1 | 5/2009 |
| EP | 0706932 A1 | 4/1996 |
| JP | 2000168649 A2 | 6/2000 |

OTHER PUBLICATIONS

International Search Report and Written Opinion dated Jan. 8, 2018 in counterpart PCT application No. PCT/US2017/057310.

(Continued)

*Primary Examiner* — Ko H Chan
(74) *Attorney, Agent, or Firm* — Brian J. Colandreo; Jeffrey T. Placker; Holland & Knight LLP (57) ABSTRACT

A high-density bike rack system includes a rack structure including: a first side configured to releasably engage a first bicycle, a second side configured to releasably engage a second bicycle, a forward portion, and a rearward portion including one or more tube assemblies. The one or more tube assemblies include at least one partially diagonal tube assembly.

17 Claims, 10 Drawing Sheets

(56) References Cited

U.S. PATENT DOCUMENTS

| | | | | |
|---|---|---|---|---|
| 4,033,459 | A * | 7/1977 | Zach | B62H 3/10 211/20 |
| D245,596 | S * | 8/1977 | Cohen | D12/115 |
| D263,945 | S | 4/1982 | Veogeli | |
| D298,746 | S * | 11/1988 | Whitworth | D12/115 |
| 4,807,453 | A | 2/1989 | Bernier et al. | |
| D302,258 | S | 7/1989 | Kalisch et al. | |
| 4,920,334 | A | 4/1990 | DeVolpi | |
| 5,096,068 | A * | 3/1992 | Theriault | B62H 3/04 211/20 |
| 5,098,155 | A * | 3/1992 | Graber | A47C 11/00 211/20 |
| 5,133,461 | A * | 7/1992 | Martinell | B62H 3/04 211/198 |
| 5,149,901 | A * | 9/1992 | Boor | G10G 5/00 248/167 |
| D337,083 | S * | 7/1993 | Rankin | D12/115 |
| D341,342 | S | 11/1993 | Pook | |
| 5,417,629 | A * | 5/1995 | Phipps | B62H 1/04 211/22 |
| D367,022 | S | 2/1996 | Graber | |
| D398,268 | S | 9/1998 | Woodcock | |
| D401,893 | S | 11/1998 | Denney | |
| D408,762 | S | 4/1999 | Denney | |
| 6,223,907 | B1 | 5/2001 | Graber | |
| 6,257,419 | B1 * | 7/2001 | Kamysiak | B62H 3/00 211/22 |
| D447,723 | S * | 9/2001 | Spangler | D12/115 |
| D497,873 | S | 11/2004 | Graber | |
| 6,948,621 | B1 * | 9/2005 | Lassanske | B62H 3/06 211/21 |
| D518,419 | S * | 4/2006 | Smith | D12/115 |
| D529,433 | S * | 10/2006 | Kane | D12/408 |
| D571,581 | S | 6/2008 | Weimer et al. | |
| D585,793 | S | 2/2009 | Skalka | |
| D588,050 | S * | 3/2009 | Levine | D12/115 |
| D602,403 | S | 10/2009 | Shaha et al. | |
| D605,093 | S * | 12/2009 | Lohr | D12/115 |
| D632,616 | S | 2/2011 | Lohr et al. | |
| D658,551 | S * | 5/2012 | Skalka | D12/115 |
| D666,537 | S * | 9/2012 | Hoadley | D12/115 |
| D683,298 | S * | 5/2013 | Snyder | |
| D715,698 | S | 10/2014 | Weeks | |
| D719,491 | S * | 12/2014 | Rayl | D12/115 |
| D719,492 | S | 12/2014 | Rayl et al. | |
| 9,145,180 | B2 * | 9/2015 | Weeks | B62H 3/08 |
| 9,371,101 | B1 | 6/2016 | Bauer et al. | |
| D774,422 | S | 12/2016 | Greenblatt et al. | |
| D774,441 | S | 12/2016 | Greenblatt et al. | |
| D776,578 | S | 1/2017 | Kuo et al. | |
| D778,788 | S | 2/2017 | Tsai | |
| D780,641 | S | 3/2017 | Sagen | |
| D805,654 | S | 12/2017 | Ziaylek et al. | |
| 10,179,620 | B2 * | 1/2019 | Hyde | B62H 3/08 |
| 10,392,064 | B2 | 8/2019 | Rossiter et al. | |
| 2006/0266717 | A1 | 11/2006 | Tsai | |
| 2013/0228535 | A1 * | 9/2013 | Wood | B62H 3/00 211/5 |
| 2015/0008197 | A1 * | 1/2015 | Blume | B62H 3/08 211/20 |

OTHER PUBLICATIONS

International Search Report and Written Opinion dated Jan. 4, 2018 in counterpart PCT application No. PCT/US2017/057316.
Non-Final Office Action issued in U.S. Appl. No. 15/788,065 dated Oct. 18, 2018.
Canadian Examination Report issued in CA Design App. No. 180914 dated Jan. 26, 2019.
Final Office Action issued in Application Serial No. 15/788,065 dated Jun. 17, 2019.
Non-Final Office Action issued in U.S. Appl. No. 29/622,789 dated Jun. 26, 2019.
Olinger, Jeffrey, "Flycycle: High Density Urban Bike Parking", Sep. 2, 2016 (https://www.youtube.com/watch?v=loxA1QvW6oy).
Non-Final Office Action issued in related U.S. Appl. No. 15/788,065 dated Oct. 1, 2019.
Final Office Action issued in related U.S. Appl. No. 15/788,065 dated Jun. 8, 2020.
Non-Final Office Action issued in related U.S. Appl. No. 15/788,065 dated Oct. 15, 2020.
Notice of Allowance issued in related U.S. Appl. No. 15/788,065 dated Mar. 10, 2021.

* cited by examiner

HIGH-DENSITY BIKE RACK SYSTEM

RELATED APPLICATION(S)

This application claims the benefit of U.S. Provisional Application Nos. 62/410,242, filed on 19 Oct. 2016; and 62/511,519, filed on 26 May 2017; the contents of which are incorporated herein by reference.

TECHNICAL FIELD

This disclosure relates to bike racks and, more particularly, to high-density bike racks.

BACKGROUND

As cities become more densely populated, the roadway infrastructure feeding these cities rapidly became overloaded. Accordingly, residents within these cities (and commuters to these cities) seek alternative means of transportation to free them from the drudgery of needing to drive within the city. While many will utilize mass transit (e.g., buses and trains), these systems are often expensive to use, overcrowded and unreliable in nature. Additionally, such systems are often inconvenient, in that such system follow a strict schedule that often does no adhere to (or work with the) the temporal needs of the user.

Accordingly, many people have turned to the use of bicycles for such personal transportation needs. In addition to being convenient and available at whatever time transportation is needed, there is a consider health benefit to the use of bicycles for transportation. Unfortunately, the ability to park bicycles within a city has not kept up with the exploding use of the same. And while there are often bike racks scattered throughout cities, these bike racks tend to be simple in design, where bicycles are attached to these bike racks in a random fashion that often results in the blocking of sidewalks and/or the damaging of bicycles.

SUMMARY OF DISCLOSURE

In one implementation, a high-density bike rack system includes a rack structure including: a first side configured to releasably engage a first bicycle, a second side configured to releasably engage a second bicycle, a forward portion, and a rearward portion including one or more tube assemblies. The one or more tube assemblies include at least one partially diagonal tube assembly.

One or more of the following features may be included. The one or more tube assemblies may be configured to intersect a seat tube of at least one of the first bicycle and the second bicycle. The one or more tube assemblies may be configured to intersect a head tube of at least one of the first bicycle and the second bicycle. A vertical displacement structure may be configured to vertically offset at least one portion of the first bicycle with respect to at least one portion of the second bicycle. The vertical displacement structure may include a ramp configured to releasably receive a front wheel of the first bicycle, thus vertically offsetting at least one portion of the first bicycle with respect to at least one portion of the second bicycle. The vertical displacement structure may be a portion of the rack structure. The at least one portion of the first bicycle may include the handle bars of the first bicycle. The at least one portion of the second bicycle may include the handle bars of the second bicycle. A mounting plate assembly may be configured to receive the rack structure and to rigidly affix the rack structure to a mounting surface. The rack structure may be constructed, at least in part, of mandrel-bent metal tubing. The forward portion of the rack structure may include a radiused structure configured to accommodate a front wheel of at least one of the first bicycle and the second bicycle.

In another implementation, a high-density bike rack system includes: a rack structure including: a first side configured to releasably engage a first bicycle, a second side configured to releasably engage a second bicycle, a forward portion, and a rearward portion including one or more tube assemblies. The one or more tube assemblies include at least one partially diagonal tube assembly and is configured to intersect a seat tube of at least one of the first bicycle and the second bicycle.

One or more of the following features may be included. A mounting plate assembly may be configured to receive the rack structure and to rigidly affix the rack structure to a mounting surface. The rack structure may be constructed, at least in part, of mandrel-bent metal tubing. The forward portion of the rack structure may include a radiused structure configured to accommodate a front wheel of at least one of the first bicycle and the second bicycle. A vertical displacement structure may be configured to vertically offset at least one portion of the first bicycle with respect to at least one portion of the second bicycle.

In another implementation, a high-density bike rack system includes: a rack structure including: a first side configured to releasably engage a first bicycle, a second side configured to releasably engage a second bicycle, a forward portion, and a rearward portion including one or more tube assemblies. The one or more tube assemblies include at least one partially diagonal tube assembly and is configured to intersect a head tube of at least one of the first bicycle and the second bicycle.

One or more of the following features may be included. A mounting plate assembly may be configured to receive the rack structure and to rigidly affix the rack structure to a mounting surface. The rack structure may be constructed, at least in part, of mandrel-bent metal tubing. The forward portion of the rack structure may include a radiused structure configured to accommodate a front wheel of at least one of the first bicycle and the second bicycle. A vertical displacement structure may be configured to vertically offset at least one portion of the first bicycle with respect to at least one portion of the second bicycle.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Referring to FIGS. 1A-1B, 2A-2B, 3A-3B, 4A-4B and 5A-5B, there is shown various views of high-density bike rack system 10. While FIGS. 1A, 2A, 3A, 4A and 5A show high-density bike rack system 10 without any bicycles attached, FIGS. 1B, 2B, 3B, 4B and 5B show high-density bike rack system 10 with two bicycles attached.

High density bike rack system 10 may be configured to allow multiple bicycles to be attached to high-density bike rack system 10 in an organized fashion that allows for the mounting of multiple bicycles without e.g., the blocking of sidewalks or the damaging of bicycles.

High-density bike rack system 10 may include rack structure 12. Rack structure 12 may be constructed, at least in part, of mandrel-bent metal tubing (e.g., aluminum tubing or galvanized steel tubing). Alternatively, rack structure 12 may be constructed of non-metallic materials such as plastic, fiberglass or carbon-fiber reinforced plastic.

As discussed above, high-density bike rack system 10 may be configured to allow multiple bicycles to be attached to it. Accordingly, rack structure 12 may include first side 14 configured to releasably engage a first bicycle (e.g., first bicycle 16) and second side 18 configured to releasably engage a second bicycle (e.g., second bicycle 20).

In order to allow multiple bicycles (e.g., first bicycle 16 and second bicycle 20) to be simultaneously mounted, high-density bike rack system 10 may include vertical displacement structure 22 configured to vertically offset at least one portion (e.g., portion 24) of first bicycle 16 with respect to at least one portion (e.g., portion 26) of second bicycle 20. Examples of the at least one portion (e.g., portion 24) of first bicycle 16 may include the handle bars of first bicycle 16 and/or examples of the at least one portion (e.g., portion 26) of second bicycle 20 may include the handle bars of second bicycle 20.

Vertical displacement structure 22 may be a portion of rack structure 12. For example and as discussed above, rack structure 12 may be constructed, at least in part, of mandrel-bent metal tubing (e.g., aluminum tubing or galvanized steel tubing). Accordingly, vertical displacement structure 22 may be constructed of similar mandrel-bent tubing and may be built into (i.e., a portion of) rack structure 12.

Typically and on most bicycles, the handle bars are the widest point of the bicycle. Therefore and in the event that a bicycle is attached to each side of a traditional bike rack, the handle bars of both bicycles would be vertically-aligned. This vertical alignment of the handle bars of bicycles attached to traditional bike racks may result in the handle bars becoming entangled; potentially damaging brake controllers, gear selectors, and the handle bars themselves.

Figure 1A:
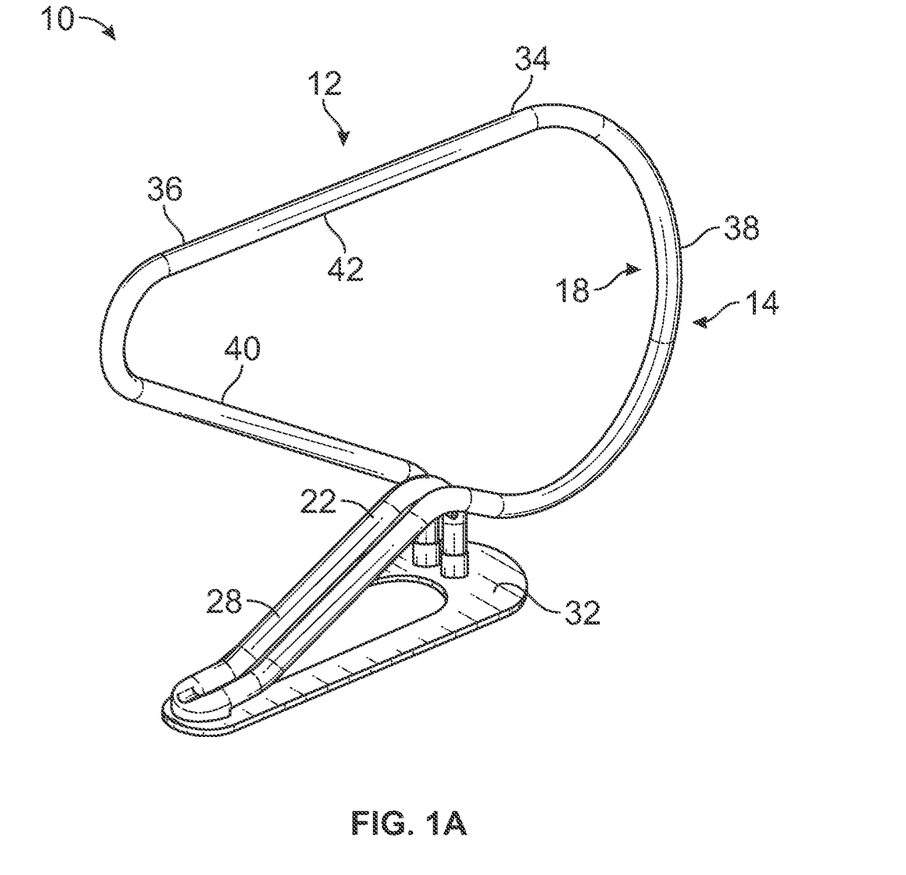
FIGS. 1A-1B are perspective views of a high-density bike rack system (with and without bicycles attached)
Figure 1B:
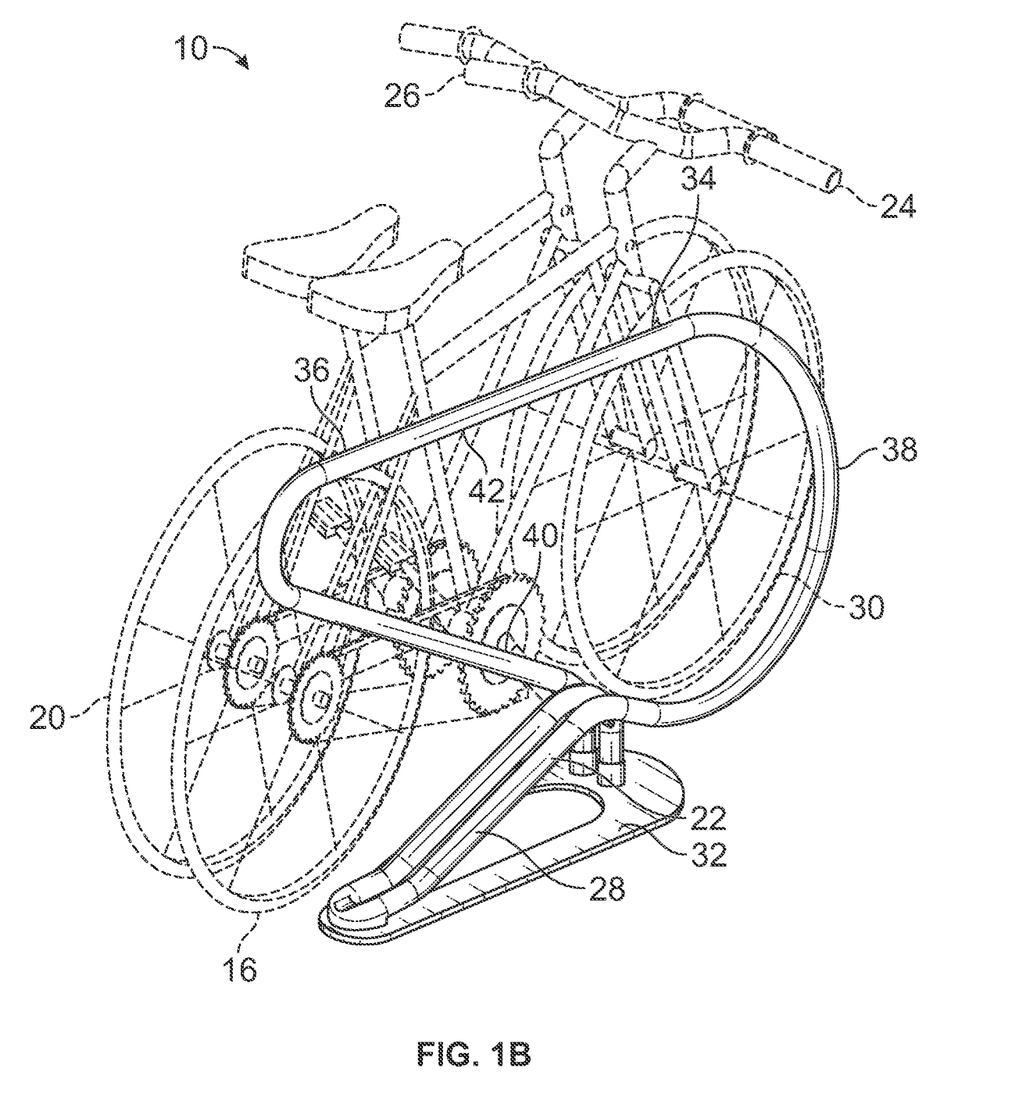
Figure 2A:
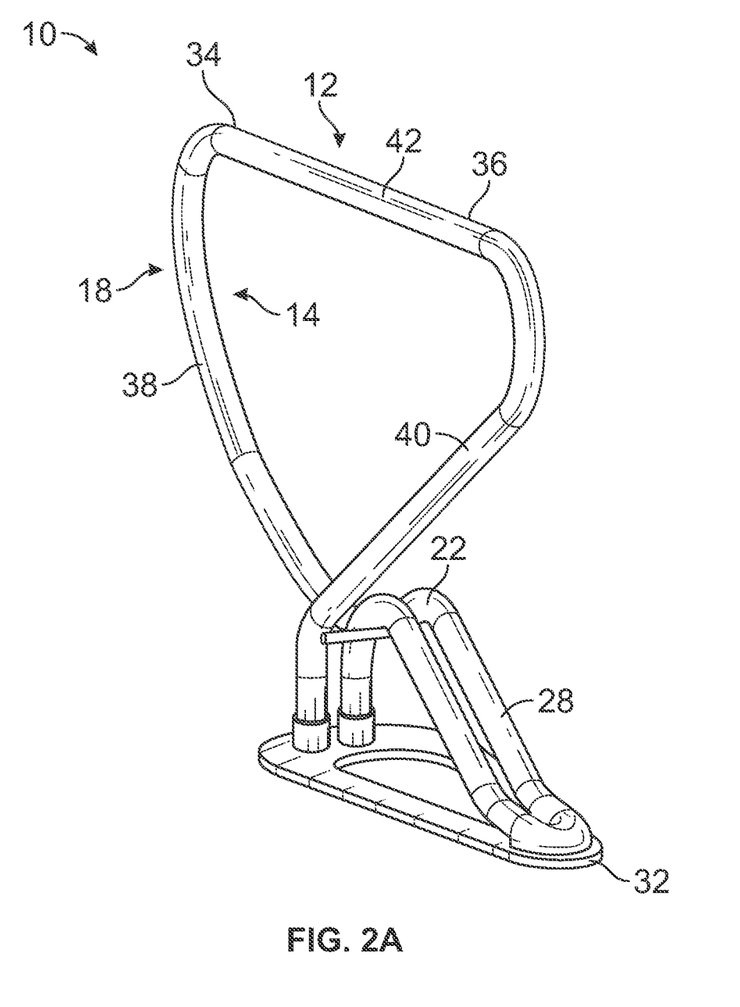
FIGS. 2A-2B are perspective views of the high-density bike rack system of FIGS. 1A-1B (with and without bicycles attached)
Figure 2B:
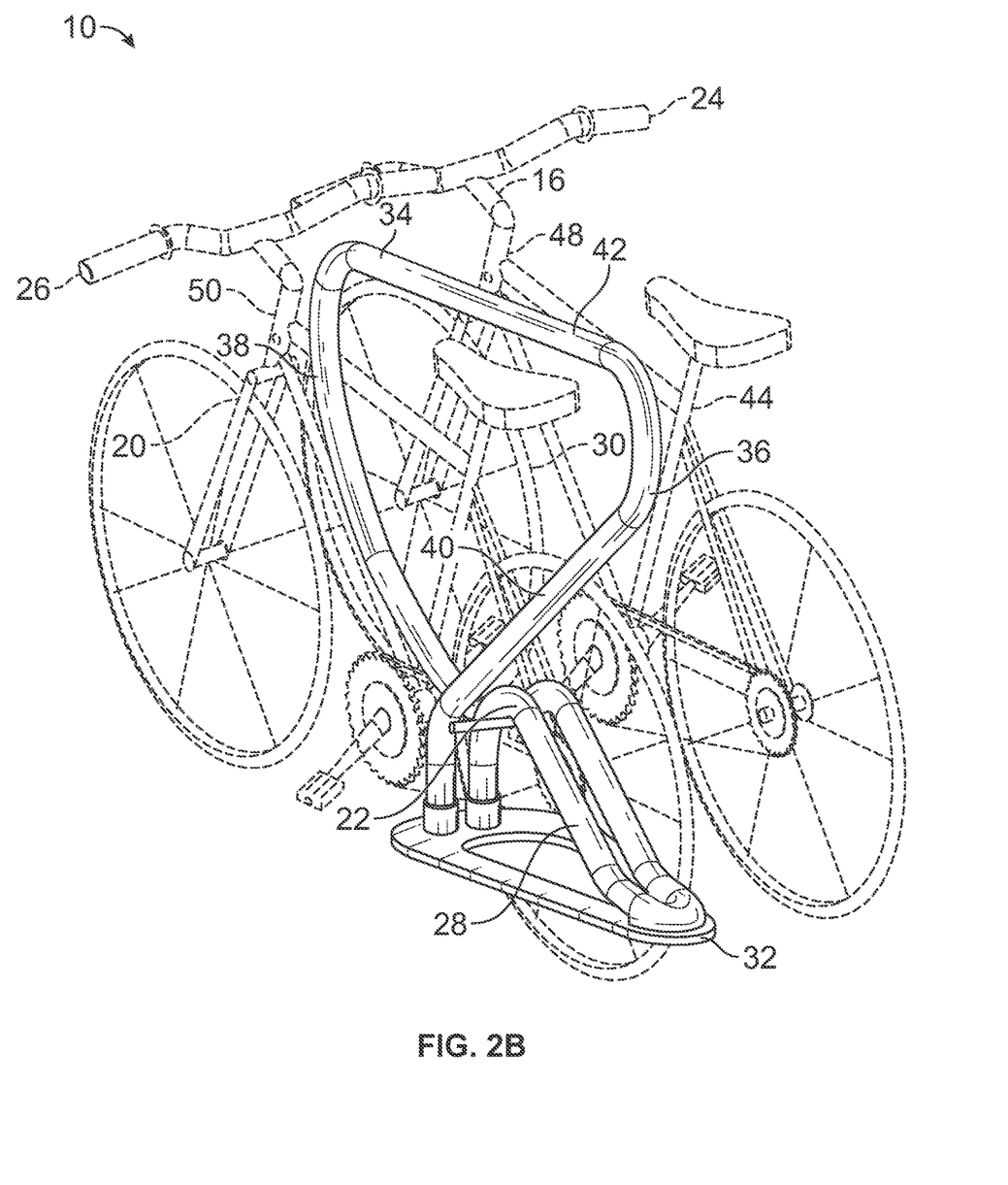
Figure 3A:
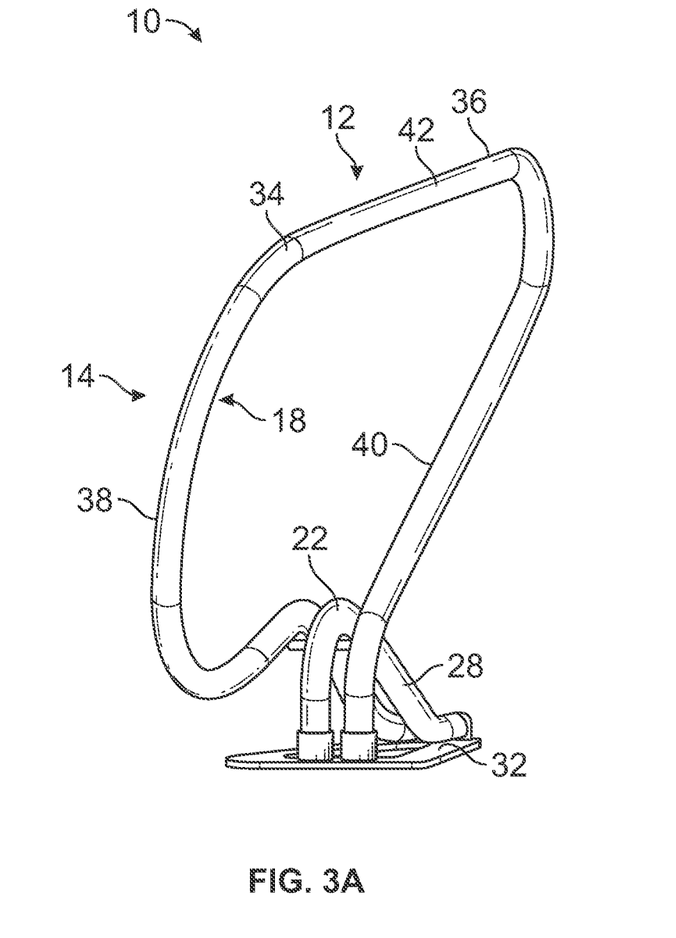
FIGS. 3A-3B are perspective views of the high-density bike rack system of FIGS. 1A-1B (with and without bicycles attached)
Figure 3B:
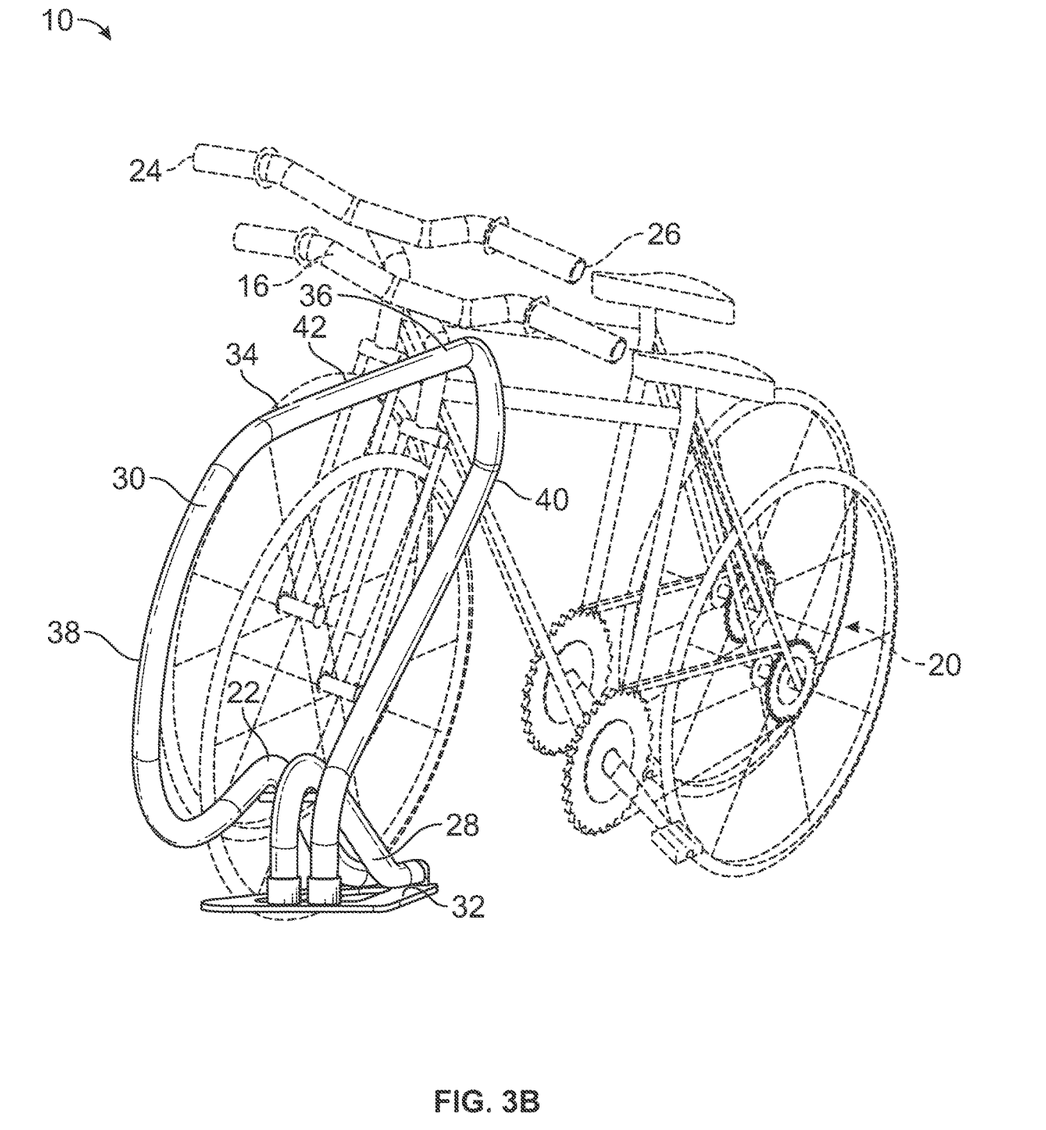
Figure 4A:
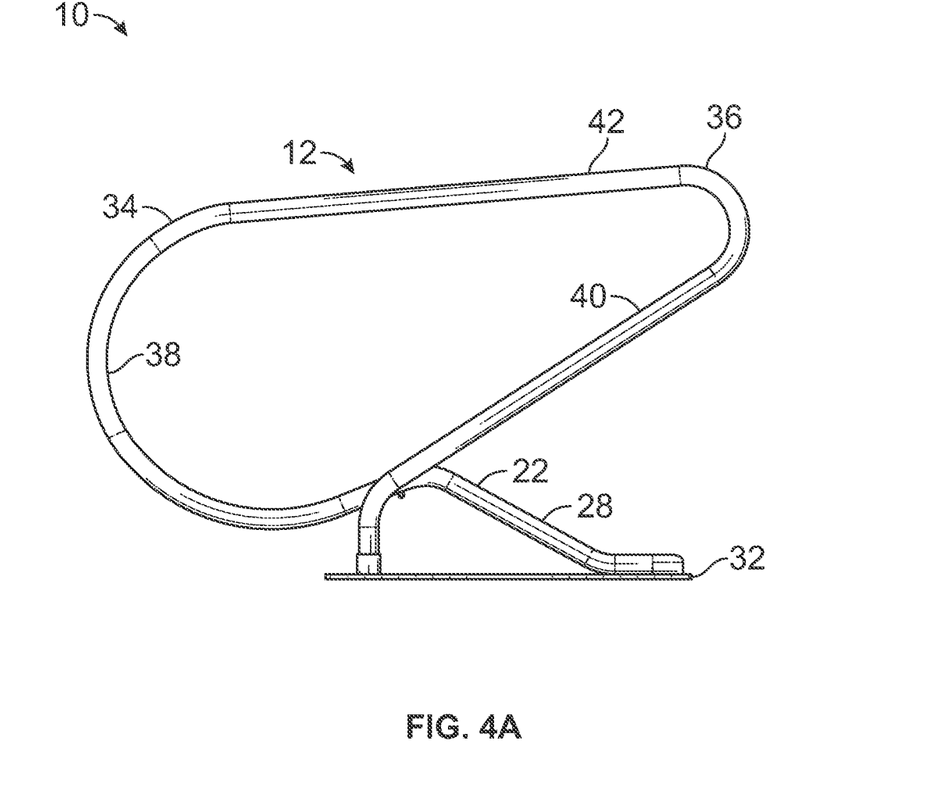
FIGS. 4A-4B are perspective views of the high-density bike rack system of FIGS. 1A-1B (with and without bicycles attached)
Figure 4B:
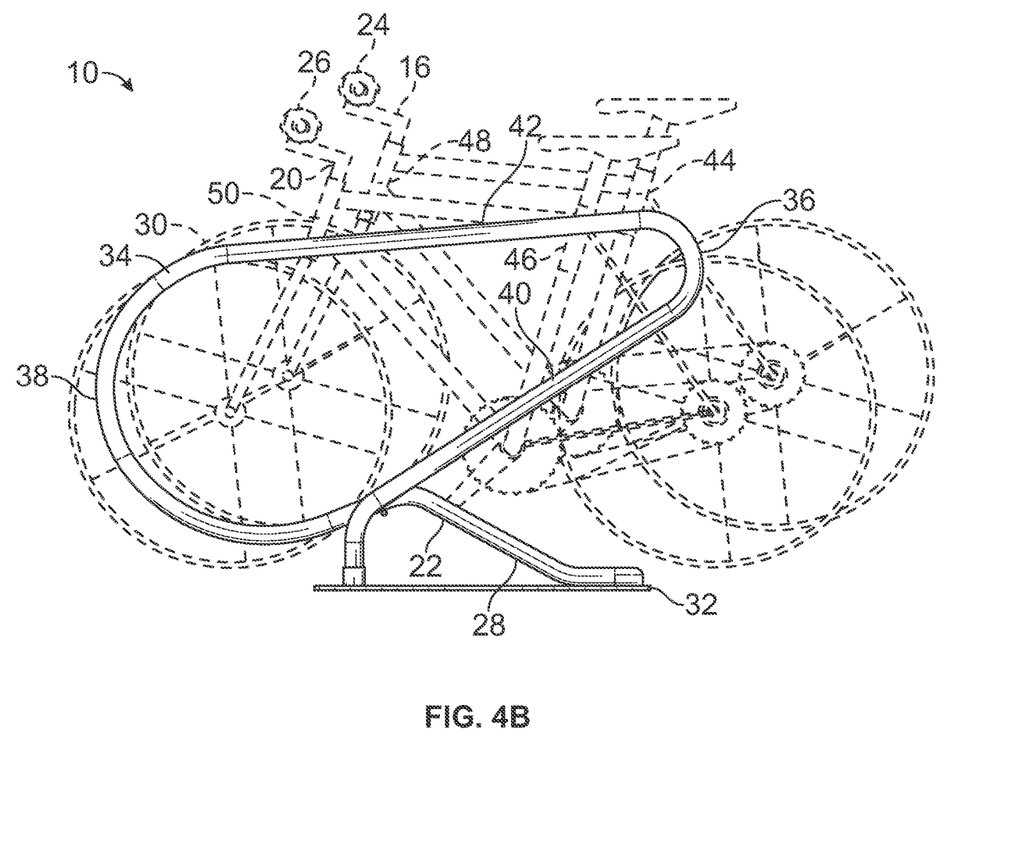
Figure 5A:
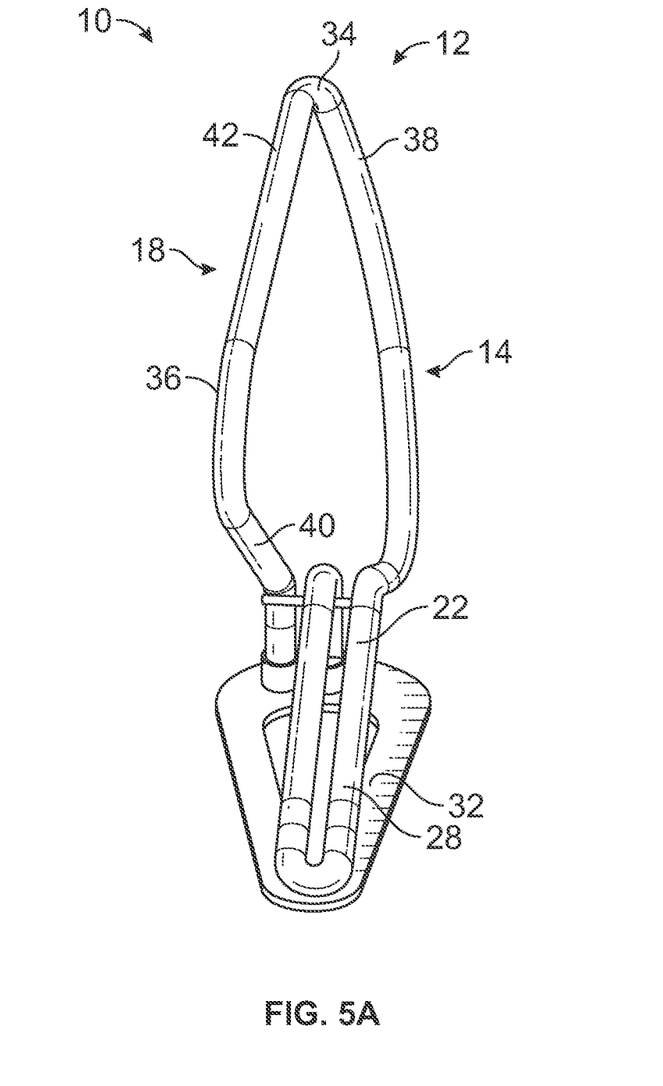
FIGS. 5A-5B are perspective views of the high-density bike rack system of FIGS. 1A-1B (with and without bicycles attached).
Figure 5B:
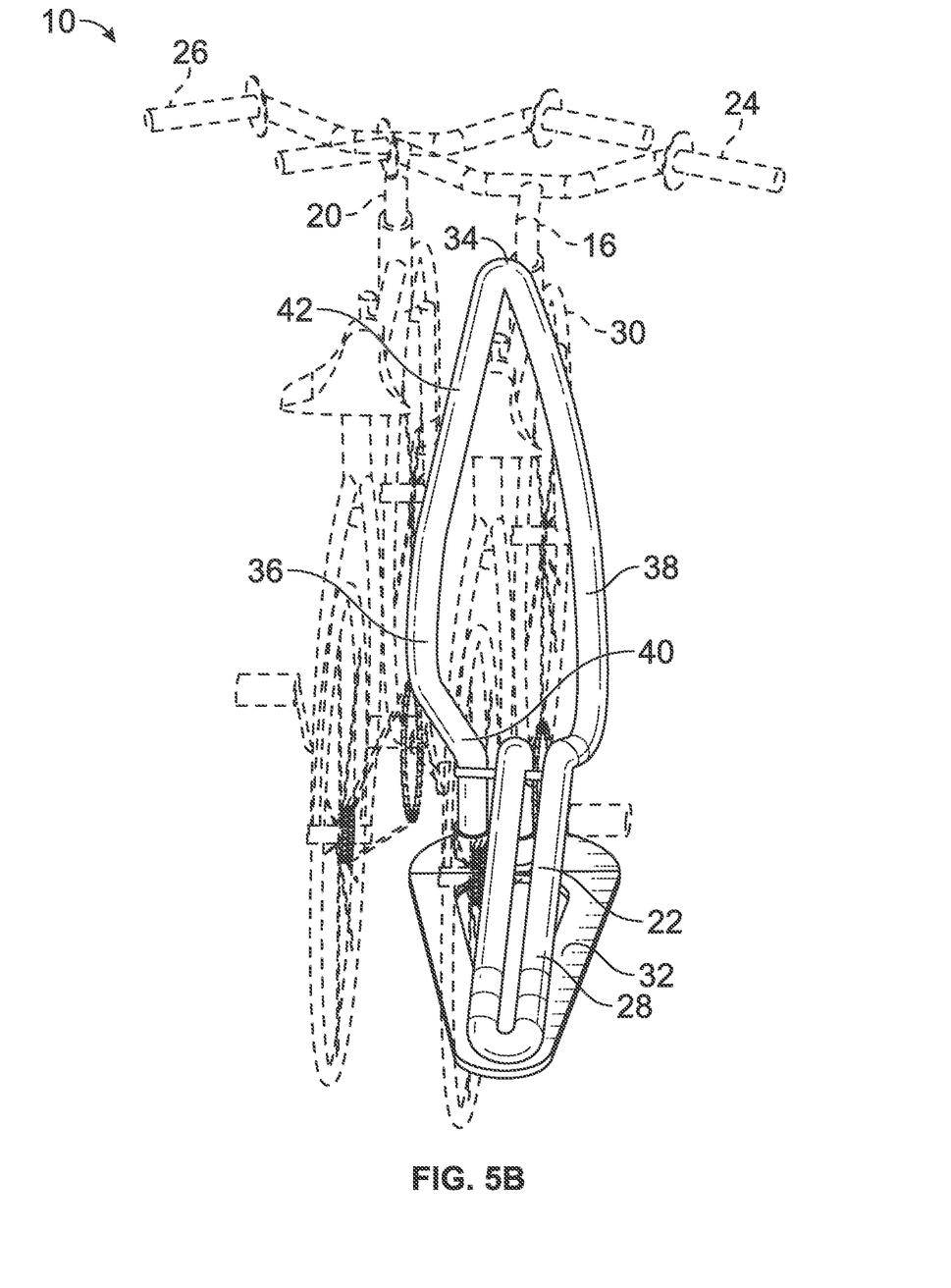

As shown specifically in FIG. 4B and through the use of vertical displacement structure 22, the handle bars (e.g., portion 24) of first bicycle 16 may be vertically offset with respect to the handle bars (e.g., portion 26) of second bicycle 20. Vertical displacement structure 22 may include ramp 28 configured to releasably receive a front wheel (e.g., front wheel 30) of first bicycle 16, thus vertically offsetting at least one portion (e.g., portion 24) of first bicycle 16 with respect to at least one portion (e.g., portion 26) of second bicycle 20. Accordingly and when a user (not shown) of high-density bike rack system 10 wishes to mount a bicycle (e.g., bicycle 16) onto high-density bike rack system 10, the user (not shown) may roll (in this example) bicycle 16 forward and up ramp 28, thus elevating the handle bars (e.g., portion 24) of first bicycle 16 will respect to the handle bars (e.g., portion 26) of second bicycle 20.

High-density bike rack system 10 may include mounting plate assembly 32, wherein mounting plate assembly 32 may be configured to receive rack structure 12 and may be configured to rigidly affix rack structure 12 to a mounting surface (e.g., a concrete or an asphalt surface). Mounting plate assembly 32 may be configured to releasably engage rack assembly 12, wherein mounting plate assembly 32 may include a plurality of sleeve assemblies into which rack structure 12 is inserted and then coupled (e.g., via tamper-proof fasteners or welds). Accordingly and in such a configuration, mounting plate assembly 32 may be mounted to e.g., a sidewalk or a parking lot, and then rack structure 12 may be inserted into and fastened to (via fasteners or welding) mounting plate assembly 32.

Rack structure 12 may include forward portion 34 and rearward portion 36; wherein forward portion 34 of rack structure 12 may include radiused structure 38 configured to accommodate front wheel 30 of first bicycle 16. For functional and/or aesthetic purposes, radiused structure 38 may be sized to essentially mimic the radius of a traditional bicycle rim (e.g., 26" in diameter). Accordingly and when mounting first bicycle 16 on first side 14 of high-density bike rack system 10, the user (not shown) may roll front wheel 30 of first bicycle 16 up ramp 28 of vertical displacement structure 22 until front wheel 30 of first bicycle 16 contacts radiused structure 38 of forward portion 34 of rack structure 12.

Rearward portion 32 of rack structure 12 may include one or more tube assemblies (e.g., tube assemblies 40, 42), wherein one or more tube assemblies (e.g., tube assemblies 40, 42) may include at least one partially diagonal tube assembly (e.g., tube assembly 40). Since rack structure 12 includes at least one partially diagonal tube assembly (e.g., tube assembly 40), high-density bike rack system 10 may be configured to more securely mount bicycles (e.g., first bicycle 16 and/or second bicycle 20).

For example, the one or more tube assemblies (e.g., tube assemblies 40, 42) may be configured to intersect a seat tube (e.g., seat tube 44 of first bicycle 16 and/or seat tube 46 of second bicycle 20). Accordingly and in such a configuration, the user (not shown) of first bicycle 16 may lock (via a bicycle lock, not shown) seat tube 44 of first bicycle 16 to tube assembly 40 and/or tube assembly 42 of rack structure 12. Additionally and in such a configuration, the user (not shown) of second bicycle 20 may lock (via a bicycle lock, not shown) seat tube 46 of second bicycle 20 to tube assembly 40 and/or tube assembly 42 of rack structure 12.

Further, one or more tube assemblies (e.g., tube assemblies 40, 42) may be configured to intersect a head tube (e.g., head tube 48 of first bicycle 16 and/or head tube 50 of second bicycle 20). Accordingly and in such a configuration, the user (not shown) of first bicycle 16 may lock (via a bicycle lock, not shown) head tube 48 of first bicycle 16 to tube assembly 42 of rack structure 12. Additionally and in such a configuration, the user (not shown) of second bicycle 20 may lock (via a bicycle lock, not shown) head tube 50 of second bicycle 20 to tube assembly 42 of rack structure 12.

General:

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A high-density bike rack system configured to be mounted on a mounting surface, comprising:
    a rack structure including:
        a first side configured to releasably engage a first bicycle,
        a second side configured to releasably engage a second bicycle,
        a forward portion including a radiused structure positioned substantially perpendicular relative to the mounting surface and configured to extend, from a first vertical portion, substantially circumferentially along the periphery of a wheel of at least one of the first bicycle and the second bicycle, thus defining a concave portion configured to receive the wheel of at least one of the first bicycle and the second bicycle,
        a rearward portion including one or more tube assemblies configured to be coupled to the radiused structure of the forward portion, wherein the rearward portion includes:
            a first section configured to extend perpendicularly from the mounting surface, thus defining a first mounting position where the first section contacts the mounting surface,
            a second section configured to extend diagonally away from the first section and the forward portion, and
            a third section configured to bend back and extend toward the forward portion and least partially over the first mounting position.

2. The high-density bike rack system of claim 1 wherein the one or more tube assemblies is configured to intersect a seat tube of at least one of the first bicycle and the second bicycle.

3. The high-density bike rack system of claim 1 wherein the one or more tube assemblies is configured to intersect a head tube of at least one of the first bicycle and the second bicycle.

4. The high-density bike rack system of claim 1 further comprising:
    a vertical displacement structure configured to vertically offset at least one portion of the first bicycle with respect to at least one portion of the second bicycle, wherein the vertical displacement structure includes a first portion configured to extend perpendicularly from the mounting surface adjacent to the first portion of the rearward portion.

5. The high-density bike rack system of claim 4 wherein the vertical displacement structure includes:
    a ramp configured to releasably receive a front wheel of the first bicycle, thus vertically offsetting at least one portion of the first bicycle with respect to at least one portion of the second bicycle.

6. The high-density bike rack system of claim 4 wherein the vertical displacement structure is at least one portion of the number of portions of the rack structure.

7. The high-density bike rack system of claim 4 wherein:
    the at least one portion of the first bicycle includes the handle bars of the first bicycle; and
    the at least one portion of the second bicycle includes the handle bars of the second bicycle.

8. The high-density bike rack system of claim 1 wherein the first section includes a mounting plate assembly configured to rigidly affix the rack structure to the mounting surface.

9. The high-density bike rack system of claim 1 wherein the rack structure is constructed, at least in part, of mandrel-bent metal tubing.

10. A high-density bike rack system configured to be mounted on a mounting surface, comprising:
    a rack structure including:
        a first side configured to releasably engage a first bicycle,
        a second side configured to releasably engage a second bicycle,
        a forward portion including a radiused structure positioned substantially perpendicular relative to the mounting surface and configured to extend, from a first vertical portion, substantially circumferentially along the periphery of a wheel of at least one of the first bicycle and the second bicycle, thus defining a concave portion configured to receive the wheel of at least one of the first bicycle and the second bicycle,
        a rearward portion including one or more tube assemblies configured to be coupled to the radiused structure of the forward portion, wherein the rearward portion includes:
            a first section configured to extend perpendicularly from the mounting surface, thus defining a first mounting position where the first section contacts the mounting surface,
            a second section configured to extend diagonally away from the first section and the forward portion, and
            a third section configured to bend back and extend toward the forward portion and least partially over the first mounting position,
        wherein the one or more tube assemblies are configured to intersect a seat tube of the first bicycle and a seat tube of the second bicycle.

11. The high-density bike rack system of claim 10 wherein the first section includes a mounting plate assembly configured to rigidly affix the rack structure to the mounting surface.

12. The high-density bike rack system of claim 10 wherein the rack structure is constructed, at least in part, of mandrel-bent metal tubing.

13. The high-density bike rack system of claim 10 further comprising:
   a vertical displacement structure configured to vertically offset at least one portion of the first bicycle with respect to at least one portion of the second bicycle, wherein the vertical displacement structure includes a first portion configured to extend perpendicularly from the mounting surface adjacent to the first portion of the rearward portion.

14. A high-density bike rack system configured to be mounted on a mounting surface, comprising:
   a rack structure including:
      a first side configured to releasably engage a first bicycle,
      a second side configured to releasably engage a second bicycle,
      a forward portion including a radiused structure positioned substantially perpendicular relative to the mounting surface and configured to extend, from a first vertical portion, substantially circumferentially along the periphery of a wheel of at least one of the first bicycle and the second bicycle, thus defining a concave portion configured to receive the wheel of at least one of the first bicycle and the second bicycle,
      a rearward portion including one or more tube assemblies configured to be coupled to the radiused structure of the forward portion, wherein the rearward portion includes:
         a first section configured to extend perpendicularly from the mounting surface, thus defining a first mounting position where the first section contacts the mounting surface,
         a second section configured to extend diagonally away from the first section and the forward portion, and
         a third section configured to bend back and extend toward the forward portion and least partially over the first mounting position,
         wherein the one or more tube assemblies are configured to intersect a head tube of the first bicycle and a seat tube of the second bicycle.

15. The high-density bike rack system of claim 14 wherein the first section includes a mounting plate assembly configured to rigidly affix the rack structure to the mounting surface.

16. The high-density bike rack system of claim 14 wherein the rack structure is constructed, at least in part, of mandrel-bent metal tubing.

17. The high-density bike rack system of claim 14 further comprising:
   a vertical displacement structure configured to vertically offset at least one portion of the first bicycle with respect to at least one portion of the second bicycle, wherein the vertical displacement structure includes a first portion configured to extend perpendicularly from the mounting surface adjacent to the first portion of the rearward portion.

* * * * *